July 28, 1953    D. J. PARMESAN    2,646,996
UNION
Filed Oct. 9, 1948
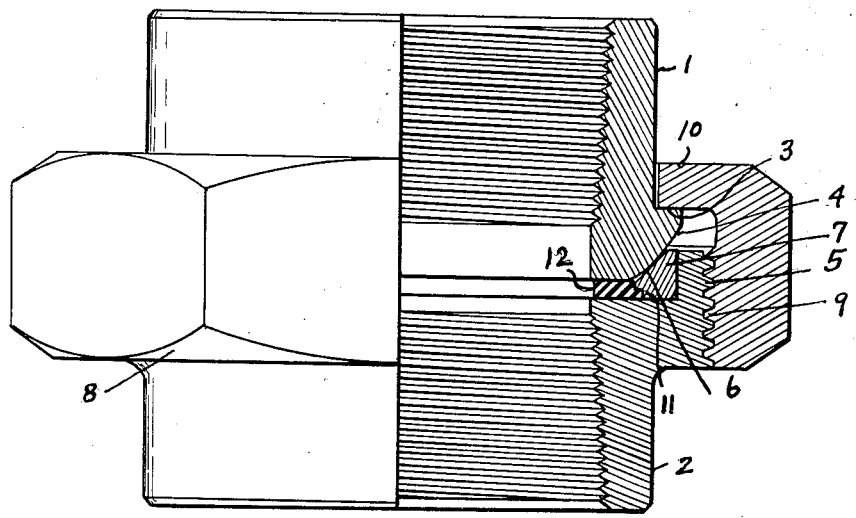
FIG. 1
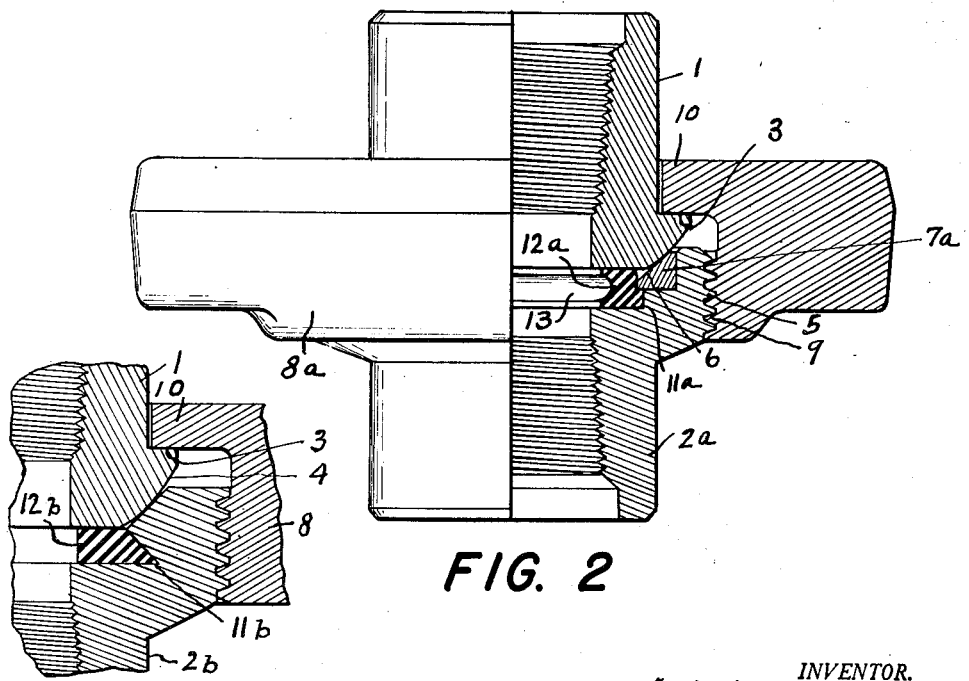
FIG. 2
FIG. 3
INVENTOR.
Daniel J. Parmesan
BY
E. V. Hardway
ATTORNEY Patented July 28, 1953

2,646,996

UNITED STATES PATENT OFFICE 2,646,996

UNION

Daniel J. Parmesan, Houston, Tex., assignor, by mesne assignments, to Chiksan Company, Brea, Calif., a corporation of California Application October 9, 1948, Serial No. 53,744

4 Claims. (Cl. 285—122)

This invention relates to a union.

An object of the invention is to provide a union of the character described embodying a gasket between the coupling members with novel means for securing the gasket in place.

The union is designed for connecting adjacent sections of a flow line and novel means have been provided for retaining the gasket in place so that it will not be displaced by the fluid flowing through the line or by external pressure should the outside pressure exceed the pressure within the line.

Briefly, it is a prime object of the present invention to provide a union wherein the gasket between the coupling members will not be liable to be displaced.

Other objects and advantages will be apparent from the following specification which is illustrated by the accompanying drawings, wherein:

Figure 1 is a side view of the union, partly in section.

Figure 2 is a side view of another embodiment of the union, partly in section, and Figure 3 is an enlarged, fragmentary, sectional view of the union illustrating still another embodiment of the invention.

Referring now more particularly to the drawings wherein like numerals of reference designate the same parts in each of the figures, the numerals 1 and 2 designate, respectively, the coupling members of the union whose outer ends are internally threaded for the connection of sections of pipe thereto.

The inner end of the coupling member 1 is formed with an external annular shoulder 3 and beyond said shoulder toward the inner end of said coupling member the coupling member has an external annular bearing surface 4 which is curved toward the inner end of said member all the way around as clearly shown in each of the figures. The abutting end of the coupling member 2 is outwardly thickened and formed with coarse external threads, as 5, and has an inside outwardly flared plane annular face 6 which has a line contact all the way around the union with the curved face 4 so as to form a metal to metal joint when said coupling members are assembled.

As illustrated there is a seat ring 7, preferably formed of bronze or other non-corrosive material may be seated within the enlarged end of the coupling member 2, as shown in Figure 1, this seat ring carrying the annular face 6 but, if desired, the coupling member 2 may be formed unitary of the same metal throughout.

There is a clamp nut 8 having coarse internal threads 9 adapted to intermesh with the threads 5 and also having an annular flange 10 which fits closely over the section 1 and which is engageable with the shoulder 3 when the threads are screwed home to clamp the facing ends of the coupling members in abutting relation.

The inside diameter of the threads 9 is slightly larger than the inside diameter of the shoulder 3 so that the clamp nut 8 may be fitted over the coupling member 1 and the threads 9 screwed onto the threads 5.

The inner end of the coupling member 2 has an inside countersunk groove 11 and, in the form shown in Figure 1, there is a ring like gasket 12 fitted between the opposing ends of the coupling members 1 and 2 and this gasket has an external annular reduced portion forming a flange which fits into and is clamped in the groove 11.

This gasket is formed of yieldable material such as neoprene or other similar material.

In the embodiment illustrated in Figure 2 the coupling member which is substantially of the same form as shown in Figure 1 but the coupling member 2a and the gasket 12a are slightly different in the corresponding parts shown in Figure 1. In this form the coupling member 2a may be made integral, that is of the same material throughout and is formed with an inside annular groove 11a or it may have a seat ring 7a of bronze or other similar non-corrosive material whose inner margin hangs thus forming one side of the groove 11a and the gasket 12a is formed with an external annular flange which fits into said groove and is also formed with an inside annular groove 13.

In this form of the union, as shown in Figure 2, there is a clamp nut 8a connecting the sections 1 and 2a in the same manner as the clamp nut 8 shown in Figure 1 but the nut 8a is provided with radial wings whereby it may be screwed home or unscrewed.

In other respects the form shown in Figure 2 is the same as that illustrated in Figure 1.

In the form shown in Figure 3 the coupling member 1 is the same as the similar member shown in Figures 1 and 2 but the coupling member 2b is formed with an inside, annular outwardly tapering groove 11b.

In this form there is a resilient seal ring 12b whose outer margin is outwardly tapered to conform to the shape of and to fit closely within the groove 11b.

This seal ring 12b is clipped tightly between opposing ends of the coupling members 1 and 2b;

also in this embodiment of the invention the seat ring 7 is not shown as separate from the coupling member 2b but is shown integral therewith.

In other respects the form shown in Figure 3 is the same as that illustrated in Figure 1. In each form the seal ring will be securely retained in place, against loss, even when the coupling members are separated.

What I claim is:

1. A union which comprises, in combination, a first and a second coupling member, said first coupling member having an annular external outwardly curved face at one end, a seat ring of corrosion-resistant metal countersunk into one end of said second coupling member and having an annular inwardly flared face adapted to seat against the outwardly curved face of said first coupling member in an annular line contact to form a metal-to-metal seal therewith, an annular resilient seal ring seated in said second coupling member internally adjacent to said seat ring, said seal ring being adapted to fit in sealing relation with the surfaces at the ends of said coupling members internally adjacent to said faces forming said metal-to-metal seal, an external annular rib on said resilient seal ring, the inner margin of said seat ring overlapping and clamping said rib to thereby maintain said resilient seal ring in position in said second coupling member and means adapted to secure said coupling members together in such a manner that the respective curved and flared faces thereof form a metal-to-metal seal and the ends of said members internally adjacent to said metal-to-metal seal are in sealing relationship with said resilient seal ring.

2. The union of claim 1 wherein the inner margin of said resilient seal ring is formed with an annular groove therein.

3. A union which comprises, in combination, a first and a second coupling member, said first coupling member having at one end a substantially flat end portion merging at its outer periphery into an external outwardly curving face, said second coupling member having at one end an annular internal inwardly flaring face of substantial width and of substantially different cross sectional contour than said curved face, an intermediate portion of said flaring face being adapted to seat against an intermediate portion of said curved face of said first coupling member in an annular line contact to form a metal-to-metal seal therewith despite substantial misalignment of the two coupling members and having a groove situated at the inner edge of said flared face, said second coupling member having a face adjacent said groove opposing said flat end portion, an annular resilient seal ring seated in said second coupling member against said face and flat end portion and internally adjacent to said inwardly flared face thereof but spaced inwardly from the portion of said flared and curving faces which seat to form said annular line contact to prevent pinching said seal ring between such seating portions of said coupling members, an external annular rib on said seal ring extending into said groove whereby said resilient seal ring is maintained in position in said second coupling member, and means for securing said coupling members together in such a manner that said metal-to-metal seal is formed and that said resilient seal ring is seated against the ends of said coupling members at a surface internally adjacent to said faces forming said metal-to-metal seal.

4. A union which comprises, in combination, a first and a second coupling member, said first coupling member having at one end a substantially flat end portion merging at its outer periphery into an outwardly curved annular external face and said second coupling member having an inwardly flared annular face of substantial width and of substantially different cross sectional contour than said curved face, an intermediate portion of said flaring face being adapted to contact an intermediate portion of the curved face of said first member in an annular line contact to form a metal-to-metal seal therewith despite substantial misalignment of the two coupling members and having a groove situated at the inner edge of said flared face, said second coupling member having a face adjacent said groove opposing said flat end portion, an annular resilient seal ring between said coupling members seated against said face and flat end portion and internally adjacent said faces forming said metal-to-metal seal, said seal ring having an external annular rib extending outwardly into said groove whereby said seal ring will be maintained in place upon separation of said coupling members, and means for securing said coupling members together in such a manner that said metal-to-metal seal is formed and said resilient seal ring is seated against the ends of said coupling members at a surface internally adjacent to but spaced from said faces forming said metal-to-metal seal despite any substantial misalignment of said coupling members.

DANIEL J. PARMESAN.

References Cited in the file of this patent

UNITED STATES PATENTS

| Number | Name | Date |
| --- | --- | --- |
| 812,642 | Crombie | Feb. 13, 1906 |
| 1,825,825 | Schulder | Oct. 6, 1931 |
| 1,968,562 | Lofgren | July 31, 1934 |
| 2,119,331 | Jensen | May 31, 1938 |
| 2,318,112 | Stillwagon | May 4, 1943 |
| 2,458,817 | Wolfram | Jan. 11, 1949 |
| 2,489,338 | Stork et al. | Nov. 29, 1949 |
| 2,493,996 | Parmesan | Jan. 10, 1950 |

FOREIGN PATENTS

| Number | Country | Date |
| --- | --- | --- |
| 482,387 | Germany | Sept. 12, 1929 |
| 489,883 | Germany | Jan. 23, 1930 |